US009946501B2

(12) United States Patent
Tonouchi

(10) Patent No.: US 9,946,501 B2
(45) Date of Patent: Apr. 17, 2018

(54) PRINT CONTROLLER, PRINT CONTROL METHOD AND NON-TRANSITORY COMPUTER READABLE RECORDING MEDIUM FOR EXECUTING A TEST PRINT

(71) Applicant: FUJI XEROX CO., LTD., Tokyo (JP)

(72) Inventor: Masaharu Tonouchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/341,360

(22) Filed: Nov. 2, 2016

(65) Prior Publication Data

US 2017/0337020 A1    Nov. 23, 2017

(30) Foreign Application Priority Data

May 23, 2016 (JP) .................................. 2016-102505
May 30, 2016 (JP) .................................. 2016-106893

(51) Int. Cl.
*G06F 3/12* (2006.01)

(52) U.S. Cl.
CPC .......... *G06F 3/1256* (2013.01); *G06F 3/1208* (2013.01); *G06F 3/1243* (2013.01); *G06F 3/1258* (2013.01); *G06F 3/1275* (2013.01); *G06F 3/1294* (2013.01)

(58) Field of Classification Search
None
See application file for complete search history.

(56) References Cited

U.S. PATENT DOCUMENTS

| 2002/0080373 A1* | 6/2002 | Collette ............... H04N 1/6033 358/1.9 |
| 2005/0080750 A1* | 4/2005 | Carling ................. G03G 21/02 705/400 |
| 2007/0165248 A1* | 7/2007 | Utsunomiya ......... G06F 3/1208 358/1.1 |
| 2008/0170259 A1* | 7/2008 | Koshika ............... G06F 3/1208 358/1.15 |
| 2010/0073706 A1* | 3/2010 | Chan .................... G06F 3/1205 358/1.15 |

FOREIGN PATENT DOCUMENTS

| JP | H10-143333 A | 5/1998 |
| JP | 2002-127570 A | 5/2002 |
| JP | 2006-338128 A | 12/2006 |

* cited by examiner

*Primary Examiner* — Thomas D Lee
(74) *Attorney, Agent, or Firm* — Oliff PLC

(57) ABSTRACT

Provided is a print controller including a receiving unit that receives a print job in a job ticket format from a print work flow system, a test print instruction unit that instructs a printing device to execute a test print using a portion of print data included in the print job when an effect that the test print according to the print job is to be executed is included in the print job, as a result of interpretation of the print job, an option change unit that changes a job option included in the print job, and a notification unit that notifies the print work flow system of test print-related information when the test print instructed to be executed by the test print instruction unit is ended.

17 Claims, 17 Drawing Sheets

FIG.9

| SETTING ITEM | CONTENTS |
|---|---|
| SCALING | DO NOT |
| RIP TYPE | CPSI |
| COPY NUMBER | 1000 |
| PAPER FEEDING | STOCK |
| SHEET TYPE | SHEET A |
| SETTING OF OUTPUT DESTINATION | PRINT |
| GIVE PRIORITY TO CONTINUOUS PRINT | DO NOT |
| GIVE PRIORITY TO DESIGNATION IN FILE | DO NOT |

FIG.11

Sample print has been completed on the printer.
Please check the changed print option.
Please push the approval button for execution of real print.
The real print will start if you push the approval button.

| SETTING ITEM | CONTENTS | CHANGE | COST VARIATION |
|---|---|---|---|
| SCALING | DO NOT | | |
| RIP TYPE | CPSI | | ● |
| COPY NUMBER | 1000 | | ● |
| PAPER FEEDING | STOCK | | |
| SHEET TYPE | SHEET A | ✓ | |
| SETTING OF OUTPUT DESTINATION | PRINT | | |
| GIVE PRIORITY TO CONTINUOUS PRINT | DO NOT | | |
| GIVE PRIORITY TO DESIGNATION IN FILE | DO NOT | | |

APPROVER AFFILIATION

APPROVER NAME

APPROVAL    CANCEL

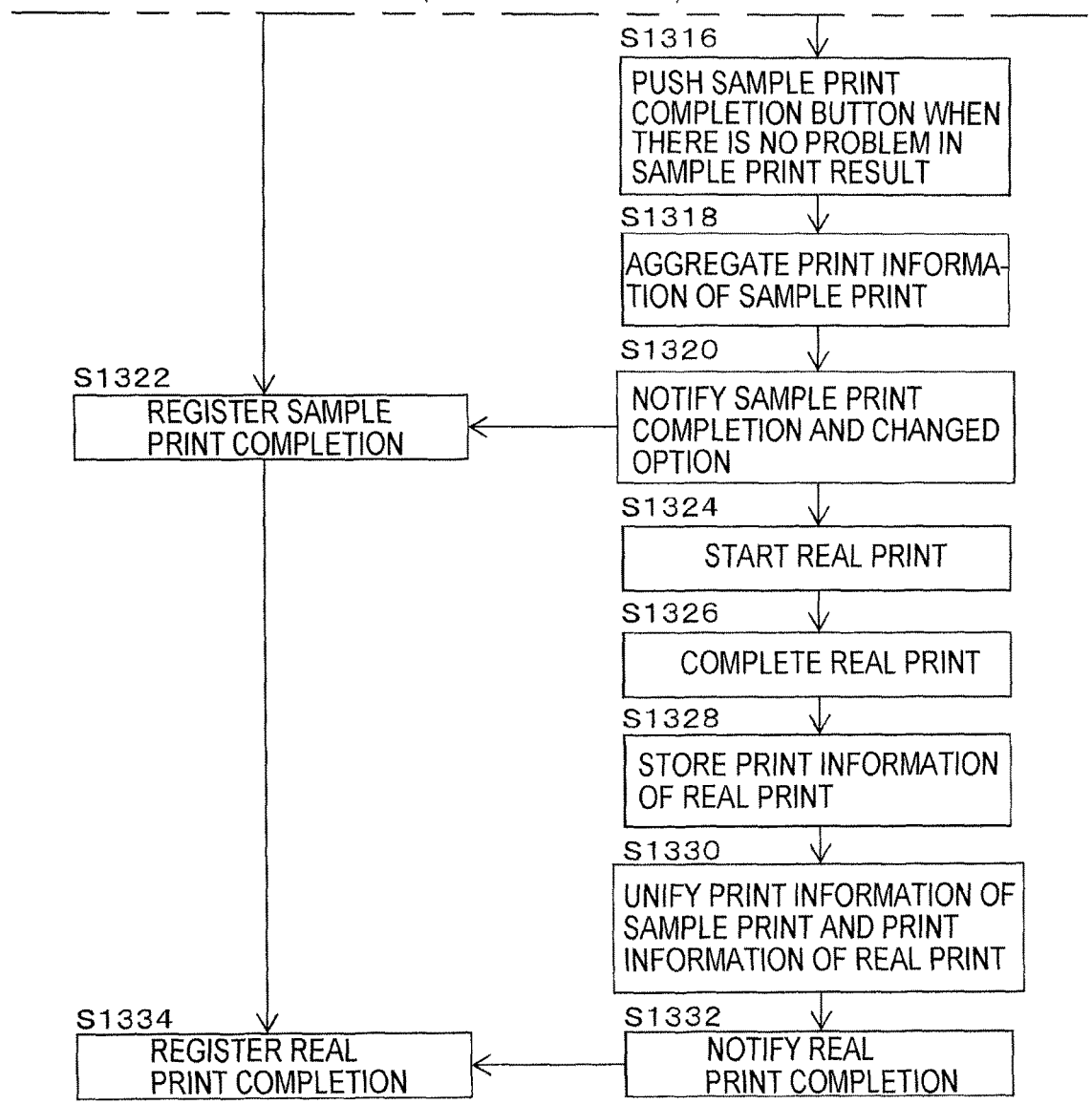

FIG.14A

| JOB ID | PRINTING DEVICE TYPE | SHEET SIZE | SAMPLE PRINT | SCRAP SHEET | REAL PRINT | SUM |
|---|---|---|---|---|---|---|
| 1 | PRINTING DEVICE A | A4 | 21 | 12 | 0 | 33 |

FIG.14B

| JOB ID | PRINTING DEVICE TYPE | SHEET SIZE | SAMPLE PRINT | SCRAP SHEET | REAL PRINT | SUM |
|---|---|---|---|---|---|---|
| 1 | PRINTING DEVICE B | A4 | 0 | 20 | 432 | 452 |

FIG.14C

| JOB ID 1442 | PRINTING DEVICE TYPE 1444 | SHEET SIZE 1446 | SAMPLE PRINT 1448 | SCRAP SHEET 1450 | REAL PRINT 1452 | SUM 1454 |
|---|---|---|---|---|---|---|
| 1 | PRINTING DEVICE A | A4 | 21 | 12 | 0 | 33 |
| 1 | PRINTING DEVICE B | A4 | 0 | 20 | 432 | 452 |

1440

PRINT CONTROLLER, PRINT CONTROL METHOD AND NON-TRANSITORY COMPUTER READABLE RECORDING MEDIUM FOR EXECUTING A TEST PRINT

CROSS-REFERENCE TO RELATED APPLICATIONS

This application is based on and claims priority under 35 USC 119 from Japanese Patent Application Nos. 2016-102505 filed May 23, 2016 and 2016-106893 filed May 30, 2016.

BACKGROUND

Technical Field

The present invention relates to a print controller, a print control method and a non-transitory computer readable recording medium.

SUMMARY

According to an aspect of the invention, there is provided a print controller including:

a receiving unit that receives a print job in a job ticket format from a print work flow system;

a test print instruction unit that instructs a printing device to execute a test print using a portion of print data included in the print job when an effect that the test print according to the print job is to be executed is included in the print job, as a result of interpretation of the print job;

an option change unit that changes a job option included in the print job; and a notification unit that notifies the print work flow system of test print-related information when the test print instructed to be executed by the test print instruction unit is ended.

BRIEF DESCRIPTION OF THE DRAWINGS

Exemplary embodiments of the present invention will be described in detail based on the following figures, wherein:

FIG. 9 is an explanatory view illustrating an example of a data structure of an option table;

FIG. 11 is an explanatory view illustrating an example of display of an option change check screen;

FIGS. 14A to 14C are explanatory views illustrating an example of a data structure of a print information table.

DETAILED DESCRIPTION

Figure 1:
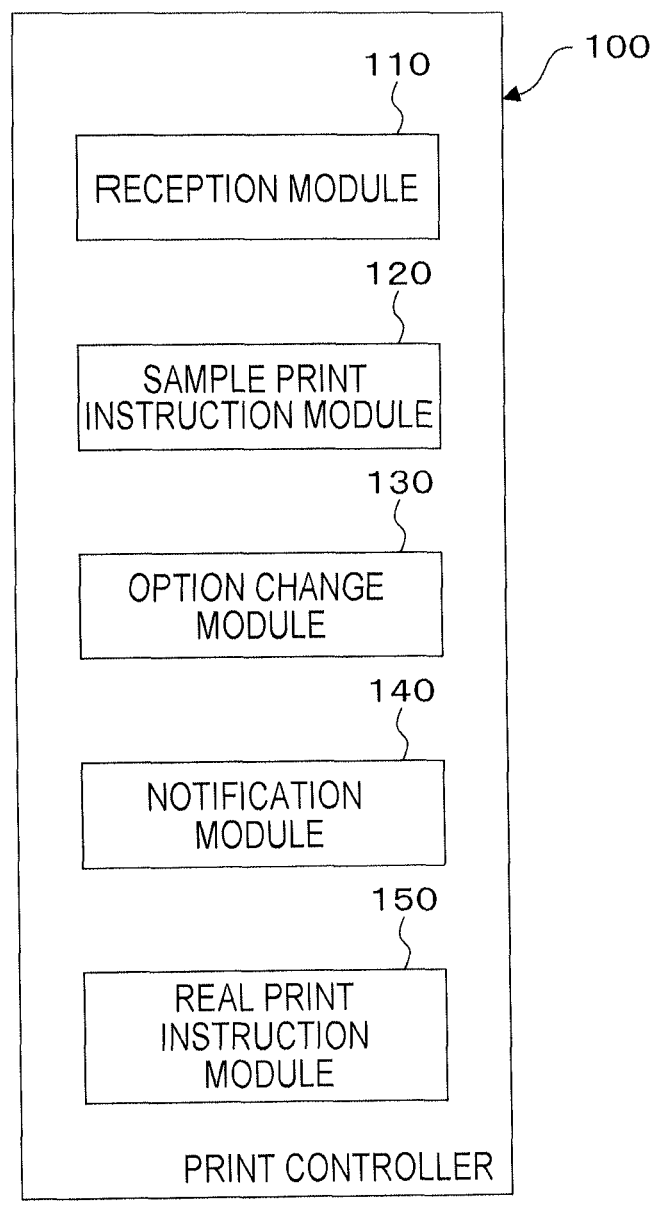
FIG. 1 is a conceptual module configuration view illustrating a configuration example of a first exemplary embodiment.

Prior to description on exemplary embodiments of the present invention, the assumption or background thereof will first be described. The descriptions are intended to facilitate the understanding of the exemplary embodiments.

There exists a function to print only one copy and confirm a result of the printing while ignoring the setting of the number of copies before printing a large number of copies. This function is called a test print (hereinafter, also referred to as a sample print or a proof print). The description "ignoring the setting of the number of copies" used herein means executing a sample print irrespective of the number of copies, instead of printing a large number of copies from the beginning, in a real print (hereinafter, also referred to as a present print).

In general, after visually checking an output product output in the sample print by an operator, if there is a problem in the output product, correction (change in job options) of various settings, such as color adjustment, positioning of a print image on a recording sheet or the like, is made, a sample print is repeatedly executed with the corrected settings, and, when it is checked that there is no problem in the output product, the entire number of copies (the first set number of copies) is output as a real print. Meanwhile, for a sample print for which it is checked that there is no problem in the output product, since the sample print has the same workmanship as the real print, the sample print may be regarded as the first copy of the real print, and the number of prints of the real print may be changed to "(the first set number of copies)−1." In particular, in such a case, in a variable print to be described later, the first record or the last record may be assumed as an object of the sample print. This is because the entire print products are aligned by adding the sample print to the beginning or end of the real print (i.e., by saving time to search a page in the middle). In addition, in a case where a sample print of plural pages is executed, the number of prints of the real print may be changed to "(the first set number of copies)−N(the number of pages of the sample print)." Then, a record of plural pages consecutive from the first record or the last record may be assumed as an object of the sample print.

Operation method (1): In an operation associated with a job definition format (JDF) work flow system, there is an operation method of again transmitting a real print job, separate from a sample print job, from the JDF work flow system after the sample print is completed.

In this operation method, after notifying the JDF work flow system side that the sample print job with the number of copies set as 1 has been completed, the real print job with the desired set number of copies is again transmitted from the JDF work flow system.

In this case, since the sample print job is different from the real print job, it is not guaranteed that an option set in the sample print job is equal to an option set in the real print job.

In addition, since cost information of sheets used for a print is different between the sample print and the real print, in order to calculate the costs incurred in the entire job, it is necessary for an administrator to specify which sample print job corresponds to the real print job and add the cost information of each job.

Operation method (2): In an operation associated with a JDF work flow system, there is an operation method in which an operator of a printer performs output and check of a sample print and a correction of a problem, and the JDF work flow system side is notified of only the completion of a real print.

The number of copies for a job is set as 1 when the sample print is executed in the printer and is returned to the original when the sample print is completed and, thereafter, the real print is executed.

In this operation method, the sample print and the real print use the same job.

However, the JDF work flow system side is not able to determine the progress until the real print is completed.

This is because it is necessary for a person to determine whether or not an output product is as expected, and the sample print completion is not able to be automatically determined and notified.

In addition, since it is not clear which setting change causes the printer side to determine that there is no problem in the sample print output, it is not able to be known which setting the real print is output in.

Hereinafter, various exemplary embodiments suitable to achieve the present invention will be described with reference to the accompanying drawings.

First Exemplary Embodiment

FIG. 1 is a conceptual module configuration view illustrating a configuration example of a first exemplary embodiment.

Meanwhile, a module, in general, indicates a logically separable component such as software (a computer program) or hardware. Accordingly, a module in the present exemplary embodiment indicates not only a module in a computer program but also a module in a hardware configuration. Hence, descriptions of the present exemplary embodiment also include descriptions of a computer program to function as the module (a program to cause a computer to execute each process, a program to cause a computer to function as each unit, and a program to cause a computer to implement each function), a system, and a method. Here, for convenience of descriptions, the expressions "store," "cause to store," and equivalent expressions thereto will be used, and when an exemplary embodiment is a computer program, the expressions indicate causing data or the like to be stored in a storage device or performing a control to store data or the like in a storage device. In addition, one module may correspond to one function. In implementation, however, one module may be configured as one program, plural modules may be configured as one program, and in reverse, one module may be configured as plural programs. In addition, plural modules may be executed by one computer, or one module may be executed by plural computers in a distributed or parallel environment. In addition, one module may include another module. In addition, hereinafter, the term "connection" is also used in a case of a logical connection (e.g. data exchange, instructions, and a reference relationship among data), in addition to a physical connection. The term "predetermined" refers to being determined prior to a target processing, and includes the meaning of being determined according to a circumstance/state at or until a specific time point before a processing by the present exemplary embodiment is started, or prior to a target processing even after a processing by the present exemplary embodiment is started. When plural "predetermined values" exist, the values may be different from each other, or two or more of the values (including any values, of course) may be identical to each other. A description indicating that "when it is A, B is executed" is used to indicate that "whether it is A is determined, and when it is determined that it is A, B is executed," except for a case where the determination of whether it is A is unnecessary.

In addition, a system or a device includes a case where the system or the device is implemented by, for example, one computer, one hardware component, and one device, in addition to a case where plural computers, hardware components, devices and others are configured to be connected to each other by a communication unit such as a network (including one-to-one corresponding communication connection). The terms "device" and "system" are used to have the same meaning. Of course, the "system" does not include a system merely meaning a social "mechanism" (social system) which is human decision.

In addition, target information is read from a storage device per processing by each module or for each of plural processes which is executed in a module. After the processing is executed, the processing result is recorded in the storage device. Accordingly, descriptions of the reading from the storage device prior to the processing and the recording in the storage device after the processing may be omitted. In addition, the storage device may include, for example, a hard disk, a random access memory (RAM), an external storage medium, a storage device through a communication line, a resistor within a central processing unit (CPU), and the like.

A print controller 100 according to this exemplary embodiment is provided to instruct a test print. As illustrated in the example in FIG. 1, the print controller 100 includes a reception module 110, a sample print instruction module 120, an option change module 130, a notification module 140, and a real print instruction module 150. In addition, the print controller 100 is connected to a work flow processor 200 and a printing device 290, which will be described later with reference to the example in FIG. 2. The print controller 100 executes a test print with one print job received from the work flow processor 200 as a print job for a test print and, thereafter, executes a real print with the received print job as a real print job. However, there is a case where a job option is changed by the test print.

The reception module 110 receives a print job in the form of a job ticket from the work flow processor 200 which is an example of a print work flow system.

As a result of the interpretation of the print job, when the effect that a test print according to the print job should be executed is included in the print job, the sample print instruction module 120 instructs the printing device 290 to execute the test print using a portion of print data included in the print job.

In addition, the sample print instruction module 120 may set the number of output copies according to the print job to 1 as a test print. Since this is the test print and the number of output copies according to the print job is generally 1, an operator does not need to set the number of copies.

In addition, when the print job is a variable print as a test print, the sample print instruction module 120 may instruct a print with one record of print data included in the print job. The variable print refers to performing a printing while changing print contents as in print products such as direct mails (DMs) in which addresses are in the same position but contents thereof are changed. Here, one print content is recorded in one record. This is because the variable print results in plural print products, and only one of the plural print products may be printed as a test print. One record as a test print object may be a predetermined record (for example, a first record), a randomly selected record, or a record selected by an operator.

The option change module 130 changes the job option included in the print job. For example, as a result of the test print, when an operation to change the job option is made by an operator who visually confirms the result, the job option is changed according to the operation. The term "job option" used herein refers to an output option related to designation of the output form. Examples of the job option may include a scaling factor (including execution or not of scaling, or the like), rotation, a slant correction, a type of a raster image processor (RIP) preparing a print image, a color adjustment parameter, and the like. The job option will be described later with reference to the example in FIG. 9.

"The effect that a test print should be executed" may be included in a print attribute in the print job received by the reception module 110. In this case, as a result of interpretation of the print attribute of the print job, when the effect that the test print according to the print job should be executed is included in the print attribute, the sample print instruction module 120 instructs the printing device 290 to execute the test print using a portion of the print data included in the print job. Then, the option change module 130 changes the job option included in the print attribute of the print job.

When the test print instructed to be executed by the sample print instruction module 120 is ended, the notification module 140 notifies the work flow processor 200 of the test print-related information.

In addition, the notification module 140 may include a job option of a portion changed by the option change module 130 in the test print-related information.

Upon receiving a response (information indicating an approval for the test print) of the work flow processor 200 to the notified test print-related information, the real print instruction module 150 instructs the printing device 290 to execute a real print job. In addition, the printing device 290 as an instruction target here may not be the same as the printing device 290 instructed to execute the test print. That is, the printing device 290 that executes the test print may differ from the printing device 290 that executes the real print.

Figure 2:
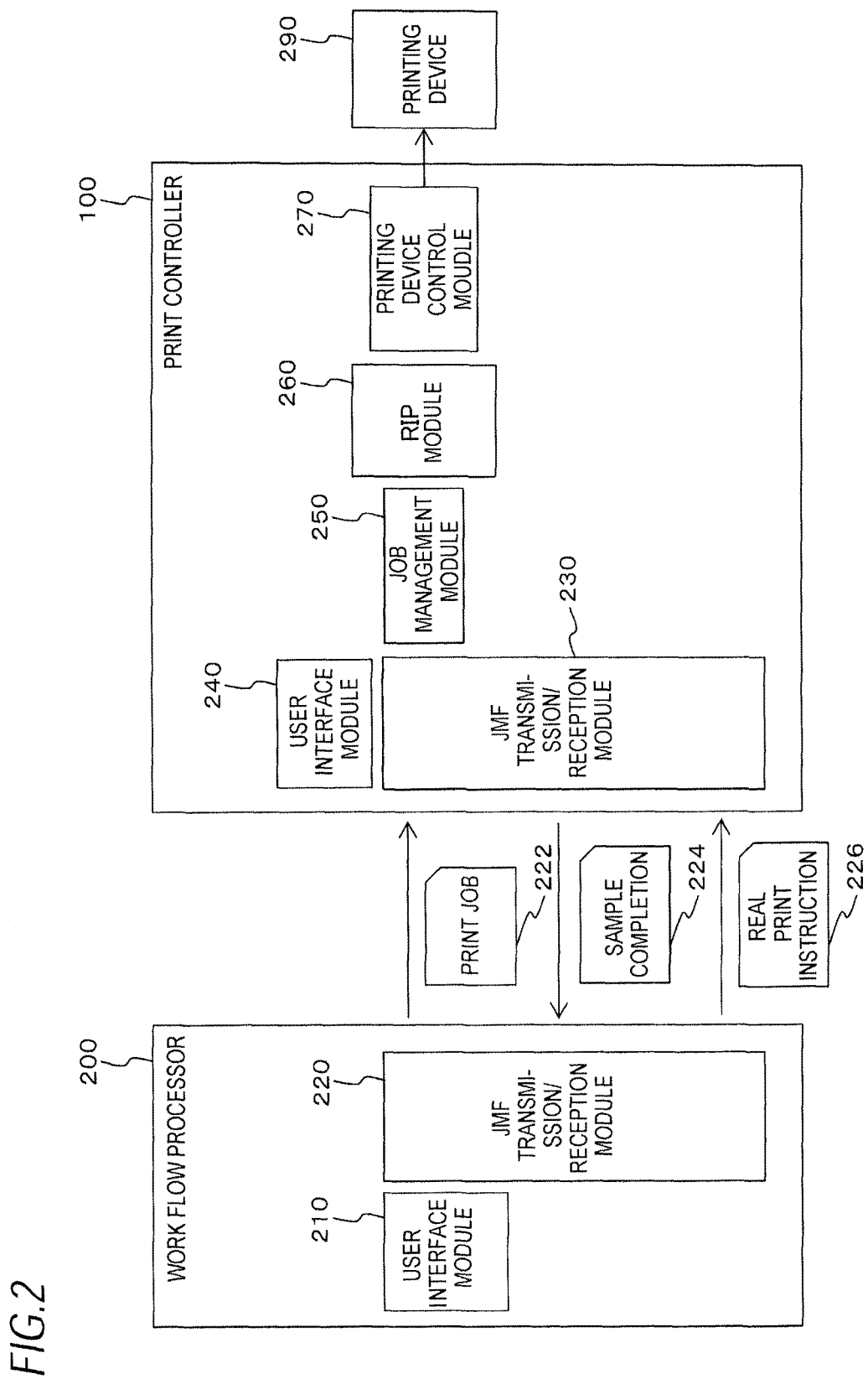
FIG. 2 is an explanatory view illustrating a configuration example of a system including a print controller, a work flow processor and a paper printing device.

FIG. 2 is an explanatory view illustrating a configuration example of a system including the print controller 100, the work flow processor 200, and the printing device 290. This system is configured base on the JDF which is the generic term for major process automation specifications of "The International Cooperation for the Integration of Processes in Prepress, Press, and Postpress organization" (CIP4).

The basic function of the JDF includes the provision of meta data used for description of the entire print job process, the provision of flexible work flow automation method, the execution of a query for allowing a work flow or a management information system (MIS) to determine the JDF function of a new device, and the provision of a command language to instruct a device in a work flow or MIS system work site.

Although one printing device 290 is illustrated in FIG. 2, the number of printing devices 290 may be two or more. In addition, a printing device 290 for a sample print and a printing device 290 for a real print may be distinguished from each other.

The work flow processor 200 includes a user interface module 210 and a job messaging format (JMF) transmission/reception module 220. In addition, the work flow processor 200 may be implemented with print work flow software. In addition, the work flow processor 200 may be included in the print controller 100.

The work flow processor 200 may include a sample print instruction in a print job 222. In addition, the work flow processor 200 may receive information of sample completion 224 from the print controller 100. Then, the work flow processor 200 may transmit a real print instruction 226 to the print controller 100.

The user interface module 210 receives an operation by an operator or the like and outputs a result of a process or the like. For example, the user interface module 210 receives an instruction of the print job 222, presents a result of the sample completion 224, and receives an instruction of the real print instruction 226. The user interface module 210 may receive an operation of a user using a mouse, a keyboard, a touch panel, a voice, an eye, a gesture or the like and combine a voice output to a voice output device such as a speaker, a vibration and the like, in addition to display on a display device such as a liquid crystal display.

The JMF transmission/reception module 220 transmits and receives messages (the print job 222, the sample completion 224, and the real print instruction 226) between the work flow processor 200 and the print controller 100. In addition, the JMF is a communication format having a multi-level function and a command language which is a portion of JDF. Like the JDF, a JMF element, which is the uppermost level element in the JDF, also exists. The JMF is defined in the JDF specifications.

The print job 222 is an example of "print job of job ticket format." The sample completion 224 is an example of "test print-related information. The real print instruction 226 is an example of a "response including information indicating approval for a test print."

The print controller 100 includes a JMF transmission/reception module 230, a user interface module 240, a job management module 250, a RIP module 260, and a printing device control module 270.

The reception module 110 and the notification module 140 illustrated in the example in FIG. 1 are included in the JMF transmission/reception module 230. The JMF transmission/reception module 230 transmits and receives messages (the print job 222, the sample completion 224, and the real print instruction 226) between the work flow processor 200 and the print controller 100.

Like the user interface module 210, the user interface module 240 receives an operation by an operator or the like and outputs a result of a process or the like. However, it is common that the operator or the like for the work flow processor 200 is a person who has a role as an administrator for print, whereas it is common that the operator or the like for the work flow processor 100 is a worker of a sample print and a real print.

The job management module 250 includes the sample print instruction module 120, the option change module 130, and the real print instruction module 150 illustrated in the example in FIG. 1. The job management module 250 controls the RIP module 260 and the printing device control module 270 to cause the printing device 290 to execute the sample print or the real print according to the print job 222 or the real print instruction 226.

The RIP module 260 generates an image for a sample print or a real print according to the control of the job management module 250. Of course, the image generated here is an image which may be printed by the printing device 290, for example, a bitmap image (raster image).

The printing device control module 270 is connected to the printing device 290. The printing device control module 270 hands over the print image generated by the RIP module 260 to the printing device 290 for print according to the control of the job management module 250.

The printing device 290 performs a print (sample print or real print) according to an instruction from the print controller 100. For example, the printing device 290 corresponds to a cut paper printer, a continuous paper printer, a production printer, a multifunction machine (an image processing apparatus with two or more of functions of a scanner, a printer, a copier, a facsimile and the like), and the like.

Figure 3:
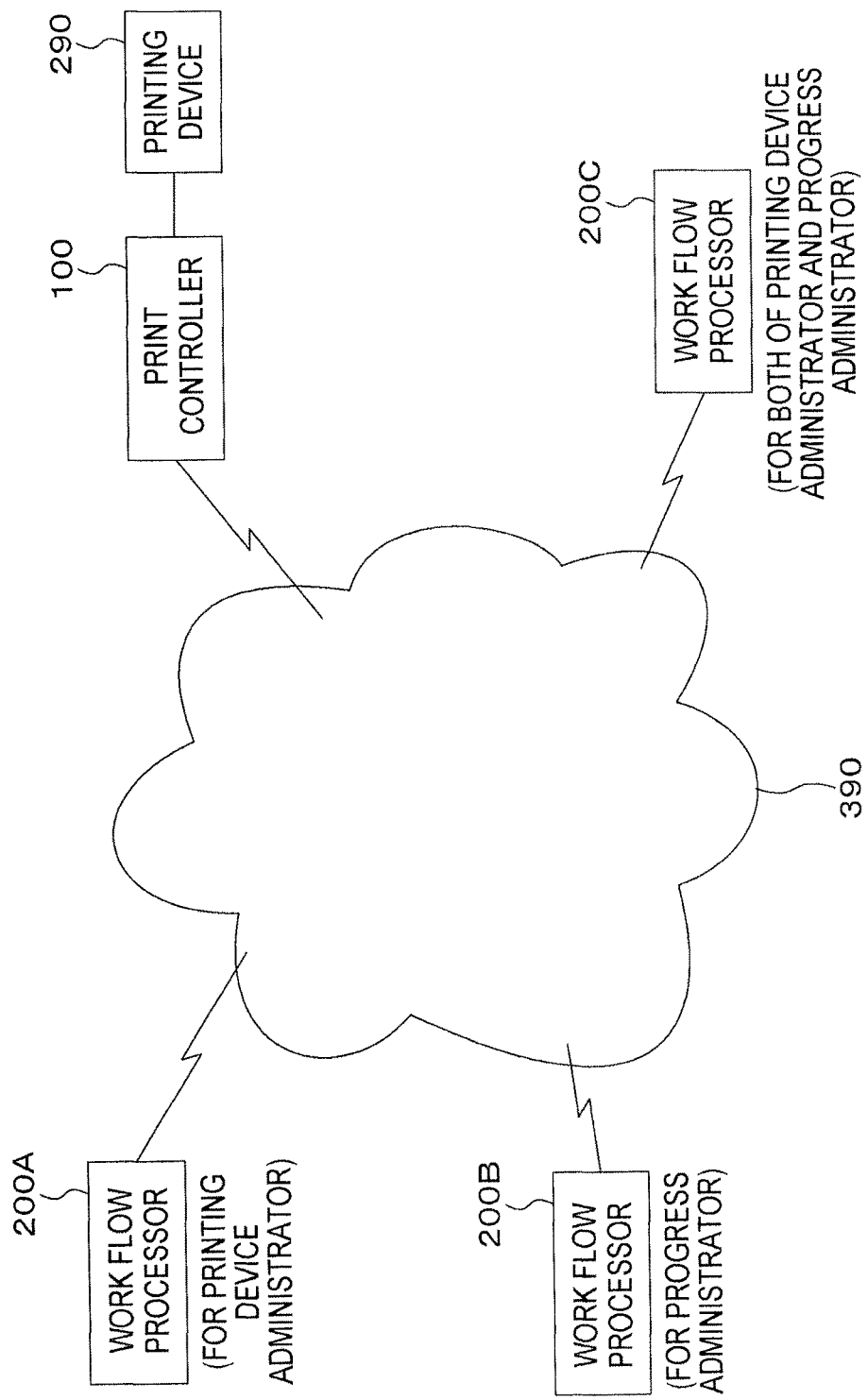
FIG. 3 is an explanatory view illustrating a configuration example of a system using this exemplary embodiment.

FIG. 3 is an explanatory view illustrating a configuration example of a system using this exemplary embodiment.

A print controller 100, a work flow processor (for a printing device administrator) 200A, a work flow processor (for a progress administrator) 200B, and a work flow processor (for both of a printing device administrator and a progress administrator) 200C are interconnected via a communication line 390. The communication line 390 may be a wired communication line, a wireless communication line or a combination thereof. For example, the communication line 390 may be the Internet, an intranet or the like as a communication infrastructure. In addition, the work flow processors 200 may be divided into a work flow processor for a printing device administrator, a work flow processor for a progress administrator and a work flow processor for both of a printing device administrator and a progress administrator.

Figure 4:
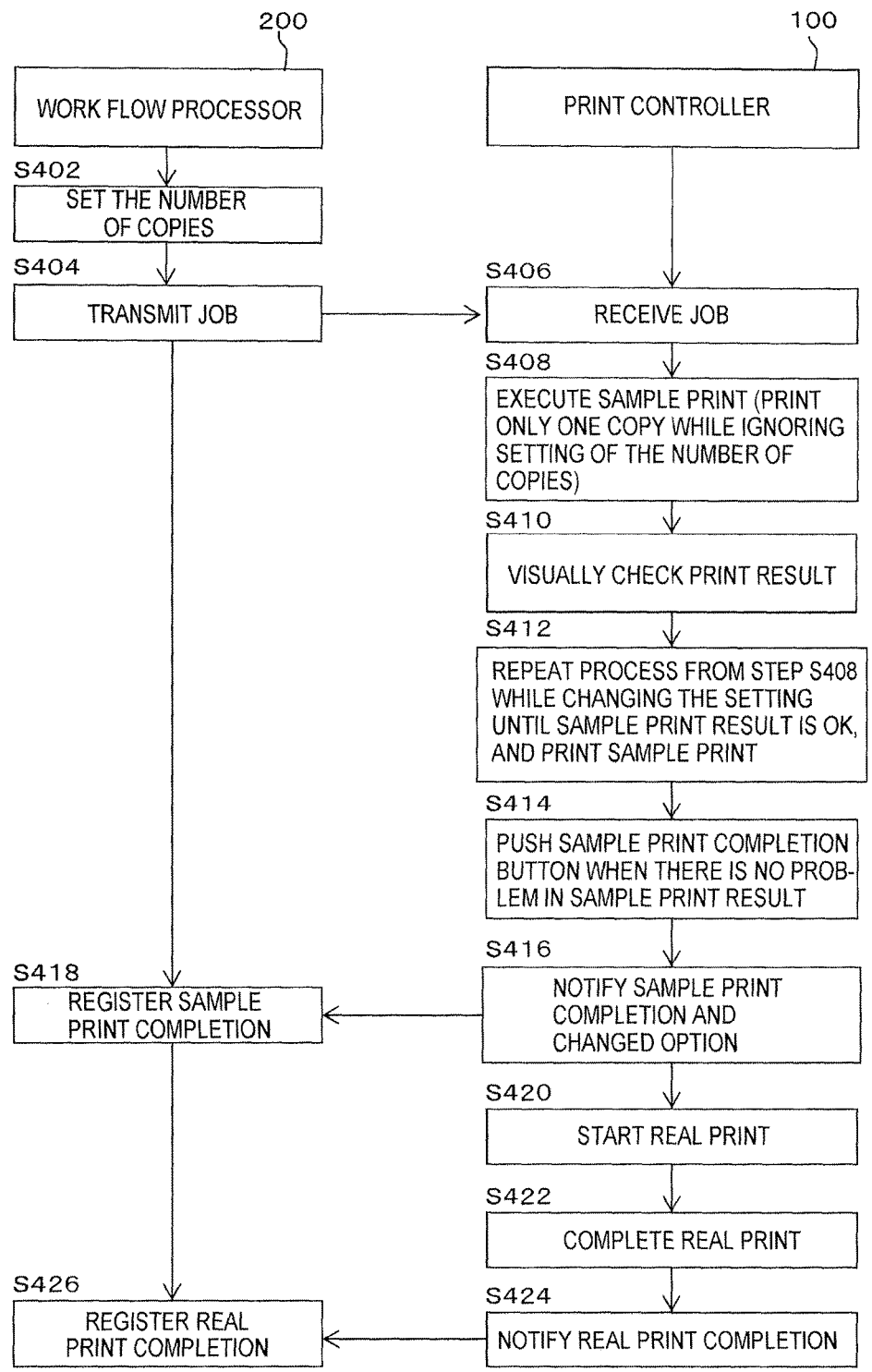
FIG. 4 is a flow chart illustrating an example of a process according a first exemplary embodiment.

FIG. 4 is a flow chart illustrating an example of a process according the first exemplary embodiment.

At Step S402, the work flow processor 200 sets the number of copies in a real print according to an operation of an operator.

At Step S404, the work flow processor 200 transmits a job to the print controller 100. In addition, an instruction of a sample print is included in this job.

At Step S406, the print controller 100 receives the job from the work flow processor 200.

At Step S408, the print controller 100 executes a sample print since the instruction of the sample print is included in the job. Only one copy is printed while ignoring the setting of the number of copies.

At Step S410, the operator of the print controller 100 visually checks a print result.

At Step S412, the print controller 100 repeats the process from Step S408 while changing the setting until the sample print result is OK, and prints the sample print. The setting may include, for example, change of a scaling factor.

Figure 6:
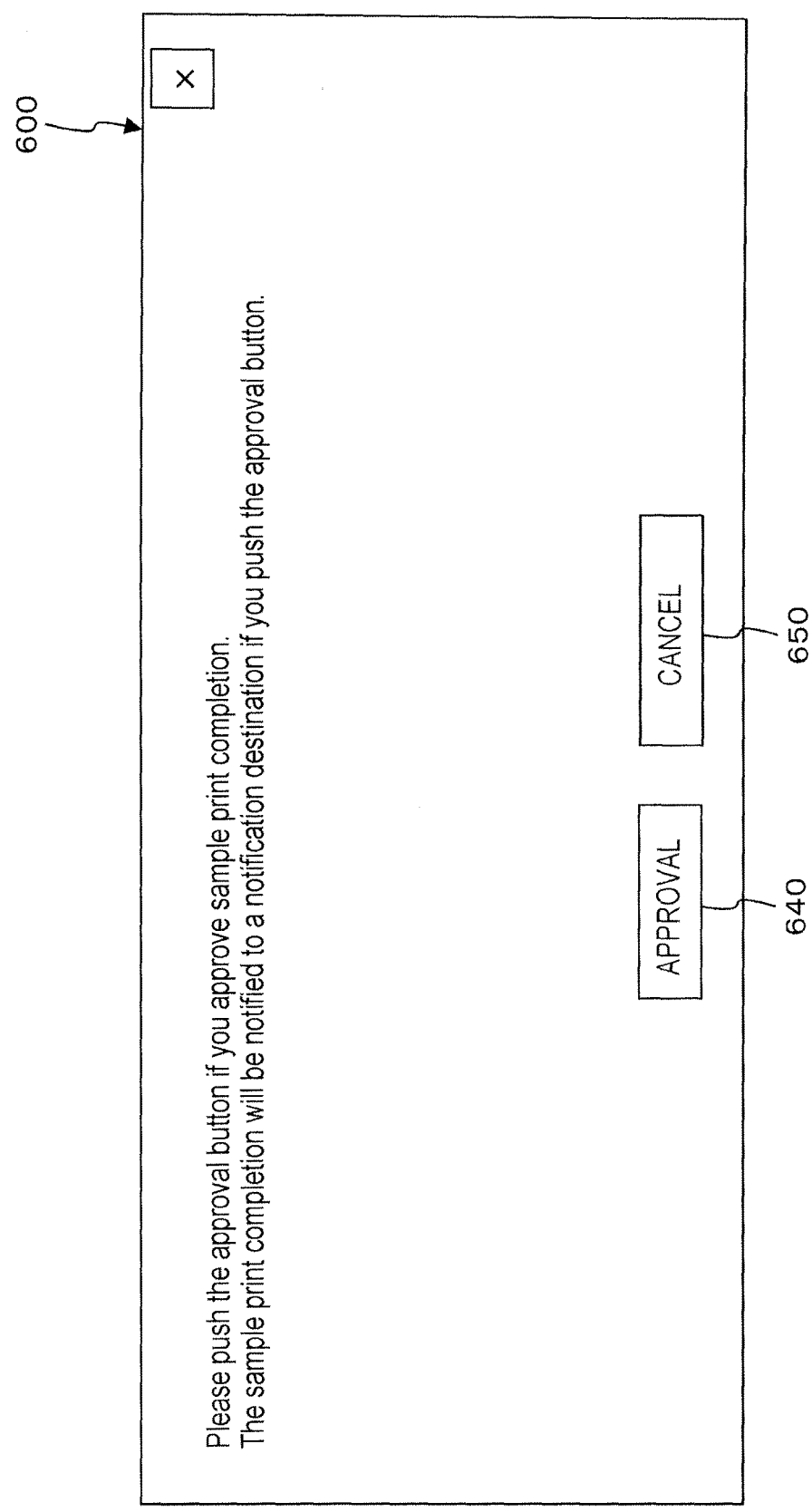
FIG. 6 is an explanatory view illustrating an example of display of a sample print check screen.

At Step S414, the print controller 100 lets the operator push a sample print completion button when there is no problem in the sample print result. For example, a sample print check screen 600 is presented. FIG. 6 is an explanatory view illustrating an example of display of the sample print check screen 600. An approval button 640 and a cancel button 650 are displayed in the sample print check screen 600. Then, for example, a message "Push the approval button when you approve sample print completion. The sample print completion will be notified to a notification destination when the approval button is pushed." is displayed in the sample print check screen 600. When the approval button 640 is pushed, the sample print is completed and transitions to a real print.

At Step S416, the print controller 100 notifies the work flow processor 200 of the sample print completion and the changed option. For example, an option table 900 is transmitted as the option. FIG. 9 is an explanatory view illustrating an example of a data structure of the option table 900. The option table 900 has a setting item field 910 and a content field 920. The setting item field 910 stores setting items. The content field 920 stores contents. The setting items include "Scaling (which may include a scaling factor)," "RIP type," "Copy number," "Paper feeding," "Sheet type," "Setting of output destination," (for example, (1) Print, (2) Only RIP with no print, (3) Only reception and store) "Give priority to continuous print," "Give priority to designation in file," (for example, which of option designation in a job and option designation of a postscript file is applied), or the like. In addition, the item "Copy number" is set as the number of copies received in Step S406, as it is. This is because this item is not changed by the sample print result. That is, even when the sample print has been completed, this copy number is not changed.

In addition, rather than the entire option table 900, only the changed option may be notified.

At Step S418, the work flow processor 200 registers the sample print completion.

At Step S420, the print controller 100 starts a real print.

At Step S422, the print controller 100 completes the real print.

At Step S424, the print controller 100 notifies the work flow processor 200 of the real print completion.

At Step S426, the work flow processor 200 registers the real print completion.

Figure 5:
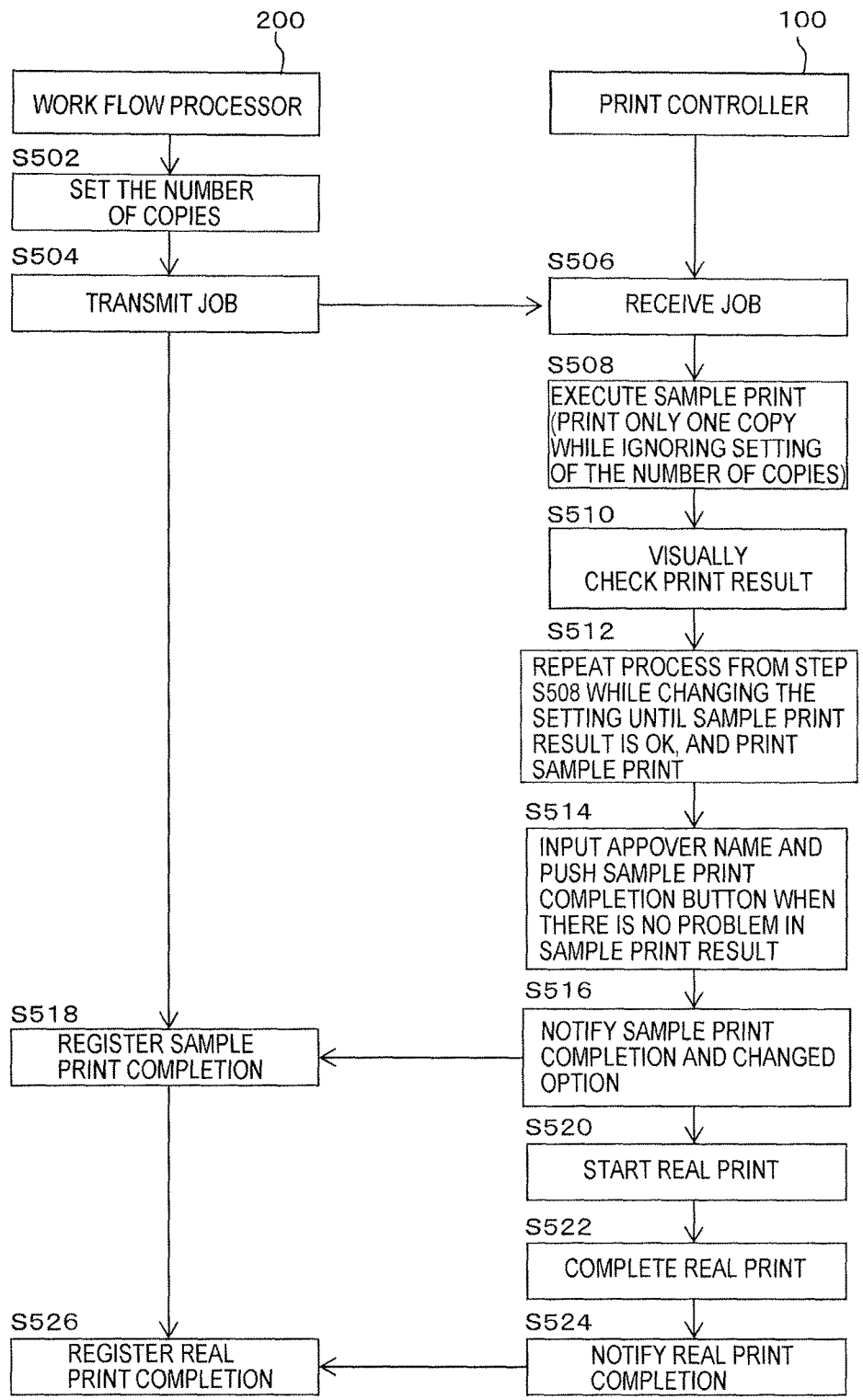
FIG. 5 is a flow chart illustrating an example of another process according to the first exemplary embodiment.

FIG. 5 is a flow chart illustrating an example of another process according to the first exemplary embodiment.

At Step S502, the work flow processor 200 sets the number of copies in a real print according to an operation of an operator.

At Step S504, the work flow processor 200 transmits a job to the print controller 100. In addition, an instruction of a sample print is included in this job.

At Step S506, the print controller 100 receives the job from the work flow processor 200.

At Step S508, the print controller 100 executes a sample print since the instruction of the sample print is included in the job. Only one copy is printed while ignoring the setting of the number of copies.

At Step S510, the operator of the print controller 100 visually checks a print result.

At Step S512, the print controller 100 repeats the process from Step S508 while changing the setting until the sample print result is OK, and prints the sample print. The setting may include, for example, change of a scaling factor.

Figure 7:
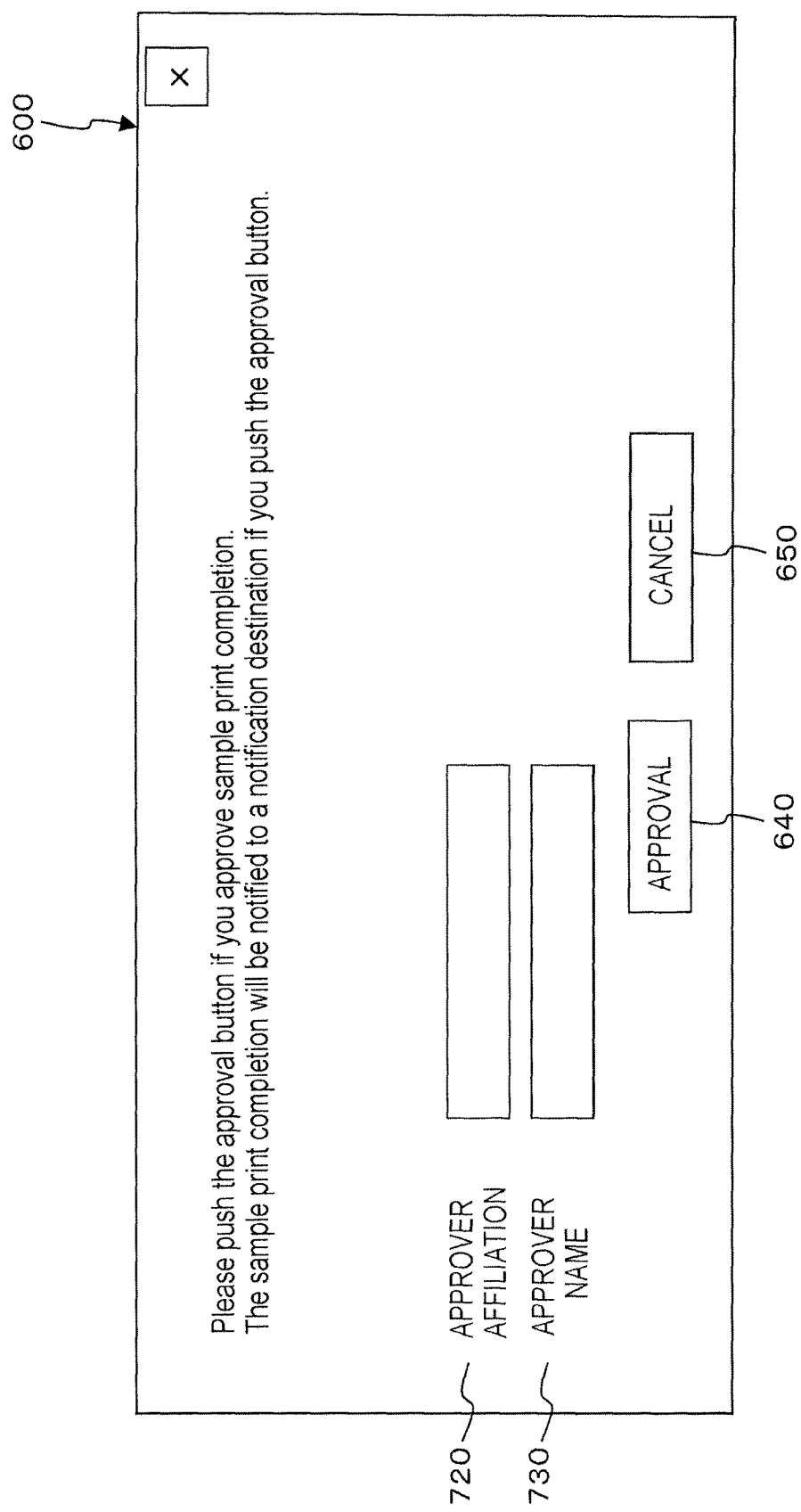
FIG. 7 is an explanatory view illustrating an example of display of a sample print check screen.
Figure 8:
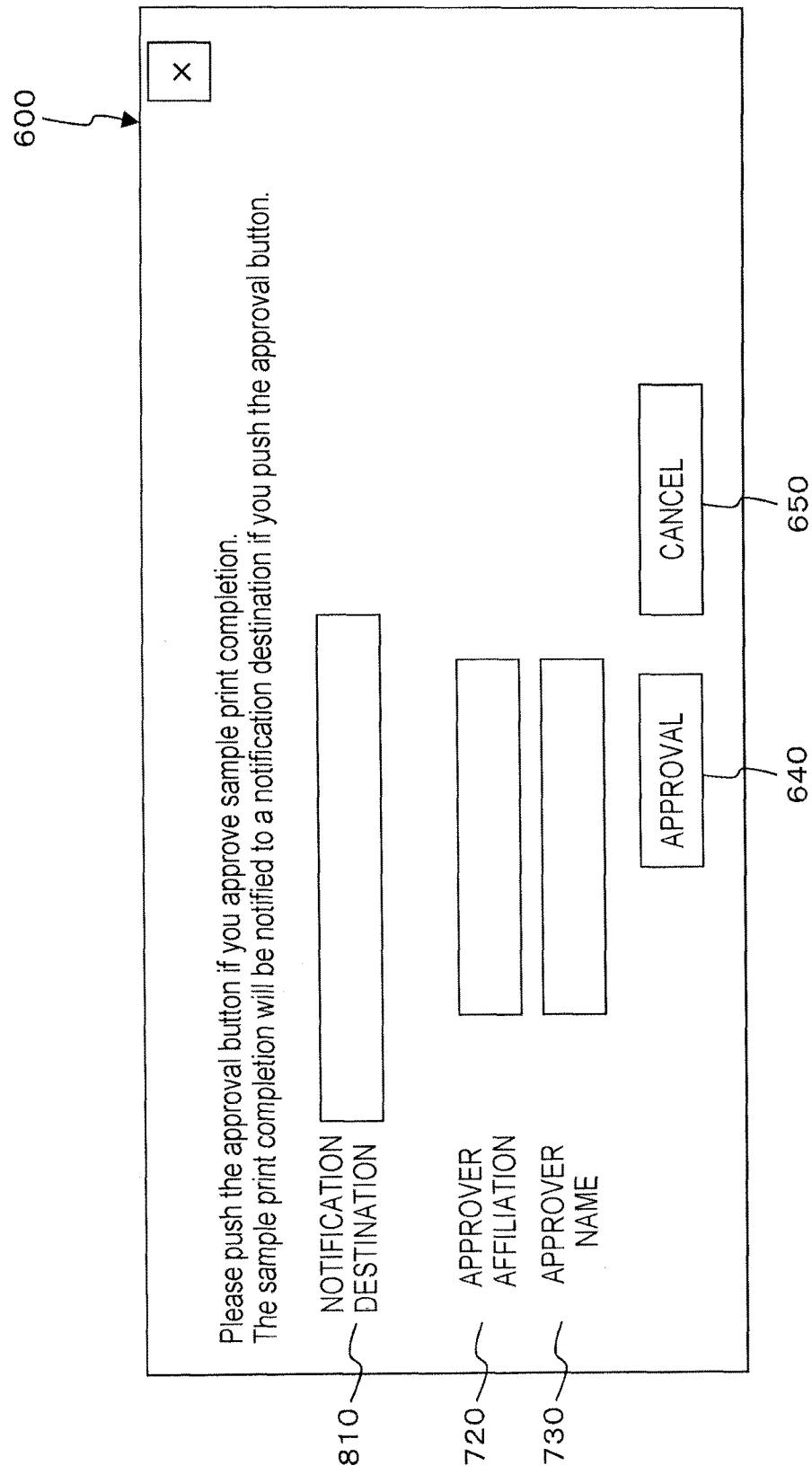
FIG. 8 is an explanatory view illustrating an example of display of a sample print check screen.

At Step S514, the print controller 100 lets the operator input a name of an approver and push a sample print completion button when there is no problem in the sample print result. For example, a sample print check screen 600 illustrated in FIG. 7 or a sample print check screen 600 illustrated in FIG. 8 is presented. FIG. 7 is an explanatory view illustrating an example of display of the sample print check screen 600. An approver affiliation field 720, an approver name field 730, an approval button 640 and a cancel button 650 are displayed in the sample print check screen 600. That is, the approver affiliation field 720 and the approver name field 730 are added to the sample print check screen 600 illustrated in the example in FIG. 6. An affiliation of a person who checks a sample print result is described in the approver affiliation field 720 and a name of the person who checks the sample print result is described in the approver name field 730. These description contents are transmitted, as information of the sample completion 224, to the work flow processor 200, which then manages (registers) this information. FIG. 8 is an explanatory view illustrating an example of display of the sample print check screen 600. A notification destination field 810, an approver affiliation field 720, an approver name field 730, an approval button 640, and a cancel button 650 are displayed in the sample print check screen 600. That is, the notification destination field 810 is added to the sample print check screen 600 illustrated in the example in FIG. 7. An address (which may be, for example, a name or the like) of the print controller 100 at which the sample completion 224 is received is described in the notification destination field 810. The sample completion 224 is transmitted according to the description contents in the notification destination field 810. For example, this is used when the sample completion 224 is transmitted to a work flow processor (for a progress administrator) 200B other than a work flow processor (for a printing device administrator) 200A which is transmitting the print job 222.

At Step S516, the print controller 100 notifies the work flow processor 200 of the sample print completion and the changed option. For example, the option table 900 is transmitted as the option.

At Step S518, the work flow processor 200 registers the sample print completion.

At Step S520, the print controller 100 starts a real print.

At Step S522, the print controller 100 completes the real print.

At Step S524, the print controller 100 notifies the work flow processor 200 of the real print completion.

At Step S526, the work flow processor 200 registers the real print completion.

Figure 10:
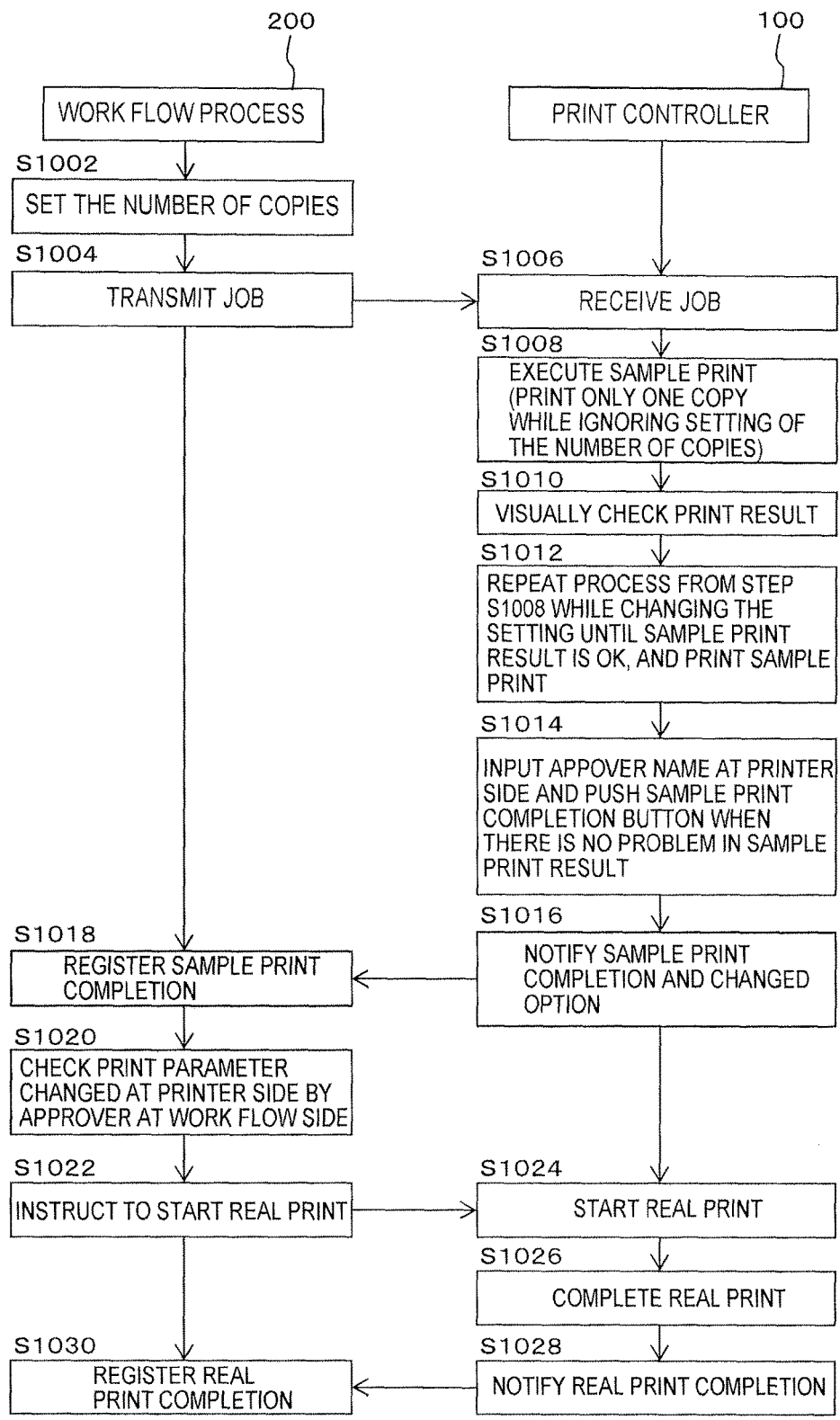
FIG. 10 is a flow chart illustrating an example of another process according to the first exemplary embodiment.

FIG. 10 is a flow chart illustrating an example of another process according to the first exemplary embodiment.

At Step S1002, the work flow processor 200 sets the number of copies in a real print according to an operation of an operator.

At Step S1004, the work flow processor 200 transmits a job to the print controller 100. In addition, an instruction of a sample print is included in this job.

At Step S1006, the print controller 100 receives the job from the work flow processor 200.

At Step S1008, the print controller 100 executes a sample print since the instruction of the sample print is included in the job. Only one copy is printed while ignoring the setting of the number of copies.

At Step S1010, the operator of the print controller 100 visually checks a print result.

At Step S1012, the print controller 100 repeats the process from Step S1008 while changing the setting until the sample print result is OK, and prints the sample print. The setting may include, for example, change of a scaling factor, or the like.

At Step S1014, the print controller 100 lets the operator input a name of a printer side approver and push a sample print completion button when there is no problem in the sample print result. For example, the sample print check screen 600 illustrated in FIG. 7 or the sample print check screen 600 illustrated in FIG. 8 is presented.

At Step S1016, the print controller 100 notifies the work flow processor 200 of the sample print completion and the changed option. For example, the option table 900 is transmitted as the option.

At Step S1018, the work flow processor 200 registers the sample print completion.

At Step S1020, in the work flow processor 200, an approver at the work flow side checks the option changed at the printer side. For example, an option change check screen 1100 is presented. FIG. 11 is an explanatory view illustrating an example of display of the option change check screen 1100. An option change result display area 1110, an approver affiliation field 1130, an approver name field 1140, an approval button 1150, and a cancel button 1160 are displayed in the option change check screen 1100. Then, for example, a message "Sample print has been completed on the printer. Check the changed print option. Push the approval button for execution of real print. The real print will start when the approval button is pushed." is displayed in the option change check screen 1100. An option table 1120 is displayed in the option change result display area 1110. The option table 1120 has a setting item field 1122, a content field 1124, a change field 1126, and a cost variation field 1128. The setting item field 1122 displays setting items. The content field 1124 displays contents. The change field 1126 displays the presence or not of change. The cost variation field 1128 displays the presence or not of cost variation. The term "cost" used herein refers to, for example, a raw material cost related to a real print (which may include a sample print) calculated from the unit price of sheets or the amount of consumption of an image forming material such as a toner. The setting item field 1122 and the content field 1124 correspond to the setting item field 910 and the content field 920 of the option table 900, respectively. The change field 1126 displays a mark in an item changed by the sample print. The cost variation field 1128 shows a cost variation when there is a variation in the marked item. This is because the marked item is a meaningful check item on cost management when the marked item is changed by the sample print. An affiliation of an approver at the work flow side is described in the approver affiliation field 1130, and a name of the approver at the work flow side is described in the approver name field 1140. The work flow processor 200 manages (registers) these information. When the approval button 1150 is pushed, the process proceeds to Step S1022.

Further, from the time point of Step S1004, it may be indicated whether or not there occurred a variation of a cost in the print. Therefore, a cost in Step S1004 may be calculated and recorded, a cost may be again calculated with the option received in Step S1018, and both costs may be compared to determine whether or not there occurred a cost variation. A cost calculation formula is predetermined, and a value in the option table 900 may be applied to a variable of the cost calculation formula.

At Step S1022, the work flow processor 200 instructs the print controller 100 to start a real print.

At Step S1024, the print controller 100 starts a real print.

At Step S1026, the print controller 100 completes the real print.

At Step S1028, the print controller 100 notifies the work flow processor 200 of the real print completion.

At Step S1030, the work flow processor 200 registers the real print completion.

Second Exemplary Embodiment

Figure 12:
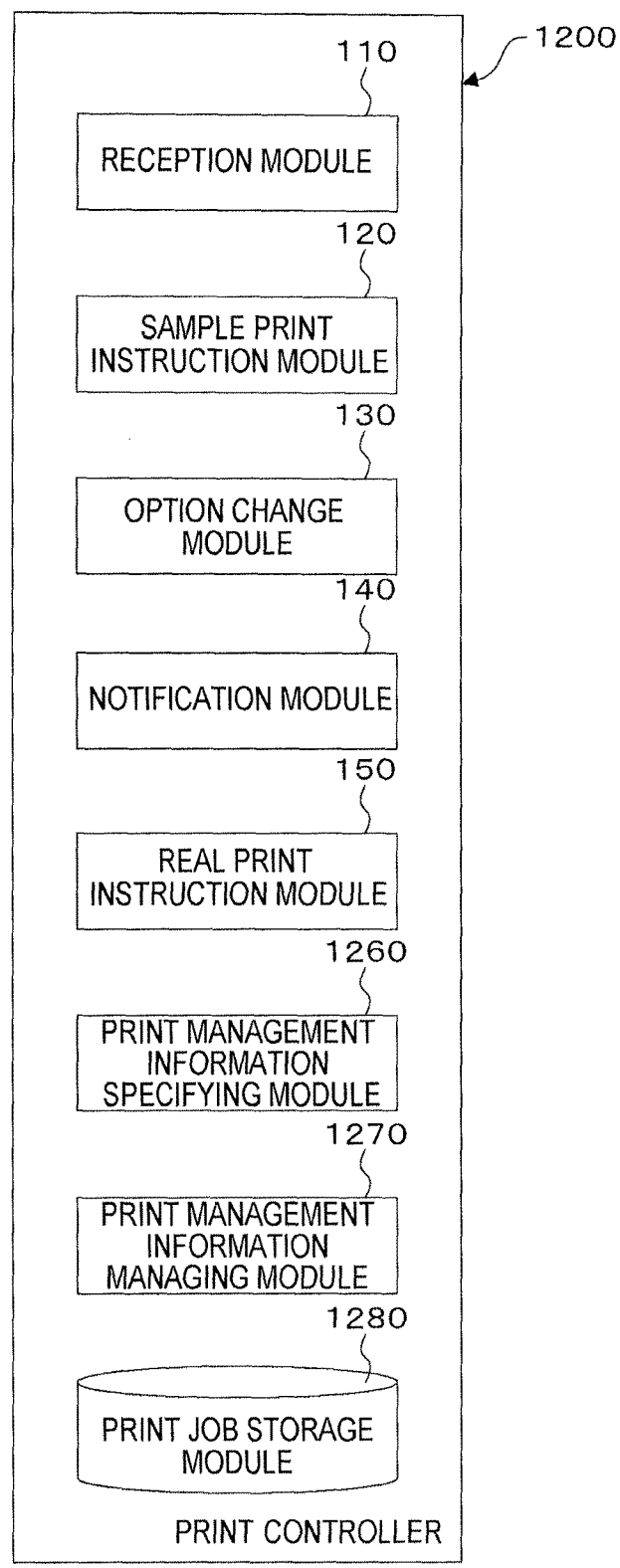
FIG. 12 is a conceptual module configuration view illustrating a configuration example of a second exemplary embodiment.

FIG. 12 is a conceptual module configuration view illustrating a configuration example of a second exemplary embodiment.

As illustrated in the example in FIG. 12, a print controller 1200 includes a reception module 110, a sample print instruction module 120, an option change module 130, a notification module 140, a real print instruction module 150, a print management information specifying module 1260, a print management information managing module 1270, and a print job storage module 1280. In the second exemplary embodiment, the same elements as those of the first exemplary embodiment will be denoted by the same reference numerals as used in the first exemplary embodiment, and overlapping descriptions thereof will be omitted.

The print management information specifying module 1260 matches test print-related information with real print-related information. Therefore, for example, identification information may be used to identify a print job uniquely in this exemplary embodiment. The test print-related information includes at least the number of prints. The real print-related information includes at least the number of prints.

The print management information managing module 1270 unifies the test print-related information and the real print-related information matched by the print management information specifying module 1260.

The print job storage module 1280 stores the test print-related information and the real print-related information or may store the unified information.

The notification module 140 notifies the work flow processor 200 of the test print-related information and the real print-related information unified by the print management information managing module 1270. The unified test print-related information and the real print-related information may be stored in the print job storage module 1280.

Figure 13:
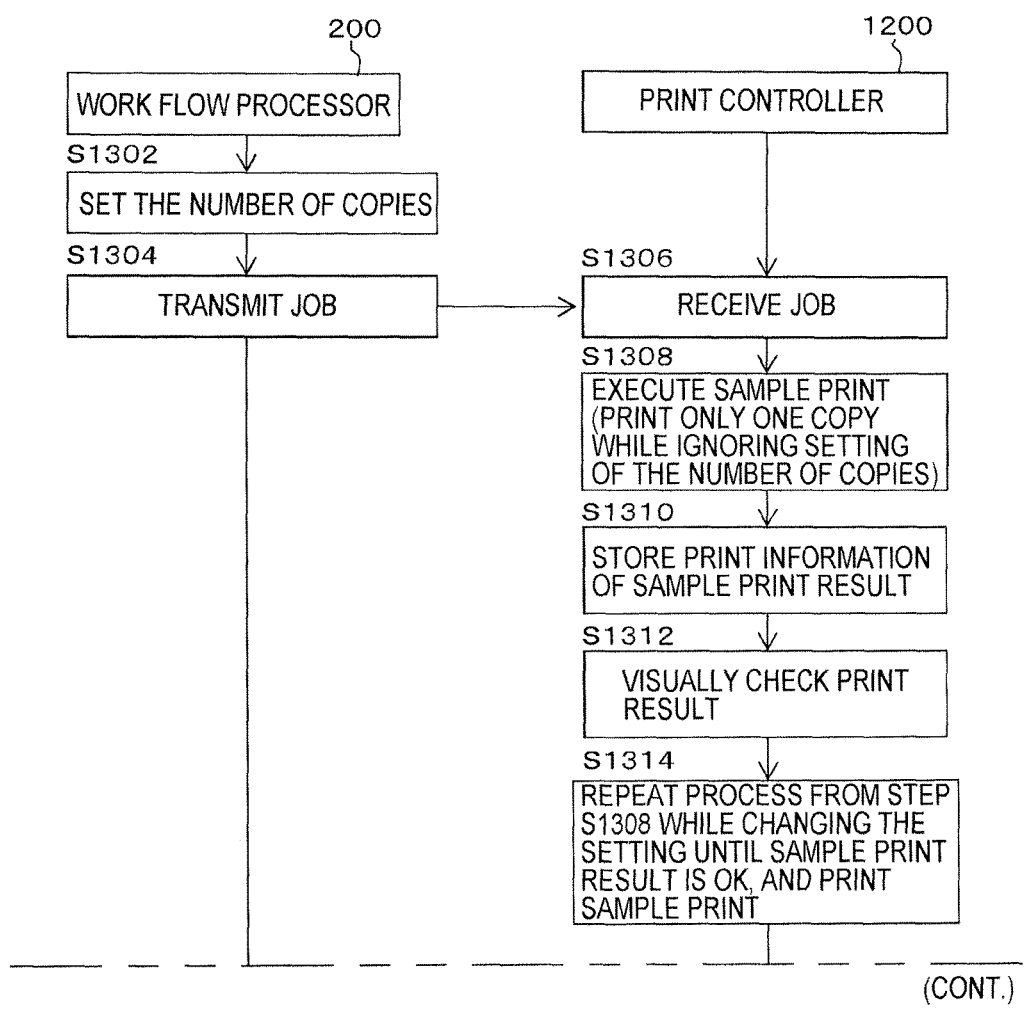
FIG. 13 is a flow chart illustrating an example of a process according the second exemplary embodiment.

FIG. 13 is a flow chart illustrating an example of a process according the second exemplary embodiment.

At Step S1302, the work flow processor 200 sets the number of copies in a real print according to an operation of an operator.

At Step S1304, the work flow processor 200 transmits a job to the print controller 1200. In addition, an instruction of a sample print is included in this job.

At Step S1306, the print controller 1200 receives the job from the work flow processor 200.

At Step S1308, the print controller 1200 executes a sample print since the instruction of the sample print is included in the job. Only one copy is printed while ignoring the setting of the number of copies.

At Step S1310, the print controller 1200 stores the print information of the sample print. For example, the print controller 1200 generates a print information table 1400 and stores the table in the print job storage module 1280. FIG. 14A is an explanatory view illustrating an example of a data structure of the print information table 1400. The print information table 1400 has a job ID field 1402, a printing device type field 1404, a sheet size field 1406, a sample print field 1408, a scrap sheet field 1410, a real print field 1412, and a summing field 1414. In this exemplary embodiment, the job ID field 1402 stores information (job ID (Identification)) for identifying a job uniquely. The printing device type field 1404 stores a printing device type. The sheet size field 1406 stores a sheet size. The sample print field 1408 stores the number of prints in the sample print. The scrap sheet field 1410 stores the number of scrap sheets (sheets wasteful in the course of production of print products). The real print field 1412 stores the number of prints in the real print. The summing field 1414 stores the total number of prints (specifically the sum of values in the sample print field 1408, the scrap sheet field 1410, and the real print field 1412). The print information table 1400 is generated every time the sample print is repeated.

At Step S1312, the operator of the print controller 1200 visually checks a print result.

At Step S1314, the print controller 1200 repeats the processing from Step S1308 while changing the setting until the sample print result is OK, and prints the sample print. The setting may include, for example, change of a scaling factor.

At Step S1316, the print controller 1200 lets the operator push a sample print completion button when there is no problem in the sample print result.

At Step S1318, the print controller 1200 aggregates the print information of the sample print. This may be achieved by adding values of the sample print field 1408 and the scrap sheet field 1410 in the print information table 1400 generated in Step S1310.

At Step S1320, the print controller 1200 notifies the work flow processor 200 of the sample print completion and the changed option.

At Step S1322, the work flow processor 200 registers the sample print completion.

At Step S1324, the print controller 1200 starts a real print.

At Step S1326, the print controller 1200 completes the real print.

At Step S1328, the print controller 1200 stores the print information of the real print. For example, the print controller 1200 generates a print information table 1420 and stores the table in the print job storage module 1280. FIG. 14B is an explanatory view illustrating an example of a data structure of the print information table 1420. The print information table 1420 has the same data structure as that of the print information table 1400.

At Step S1330, the print controller 1200 unifies the print information of the sample print and the print information of the real print. For example, the print controller 1200 generates a print information table 1440 and stores the table in the print job storage module 1280. FIG. 14C is an explanatory view illustrating an example of a data structure of the print information table 1440. The print information table 1440 has the same data structure as that of the print information table 1400. The print information table 1440 is a unification of the print information table 1400 and the print information table 1420. Specifically, the print information table 1440 is a combination of the print information table 1400 included in a first row and the print information table 1420 included in a second row. In addition, the print information table 1440 unifies print information tables having the same job ID.

At Step S1332, the print controller 1200 notifies the work flow processor 200 of the real print completion. The print information table 1440 is included in this notification.

At Step S1334, the work flow processor 200 registers the real print completion. The work flow processor 200 can also receive the print information table 1440 and manages the number of prints in the sample print and the real print. Thereafter, the number of prints in the sample print and the real print may be handed over to MIS.

Although the flow chart illustrated in the example in FIG. 13 applies the second exemplary embodiment to the flow chart illustrated in the example in FIG. 4, the second exemplary embodiment may be applied to the flow chart illustrated in the example in FIG. 5 or FIG. 10. Specifically, in the flow chart illustrated in the example in FIG. 5, Step S1310 may be interposed between Step S508 and Step S510, Step S1318 may be interposed between Step S514 and Step S516, and Step S1328 and Step S1330 may be interposed between Step S522 and Step S524. In the flow chart illustrated in the example in FIG. 10, Step S1310 may be interposed between Step S1008 and Step S1010, Step S1318 may be interposed between Step S1014 and Step S1016, and Step S1328 and Step S1330 may be interposed between Step S1026 and Step S1028.

In addition, the print management information specifying module 1260, the print management information managing module 1270, and the print job storage module 1280 may be included in the work flow processor 200 side. In this case, every time a print is completed, the print controller 1200 may notify the work flow processor 200 of print information and may use the print information to generate the print information table 1400 illustrated in the example in FIGS. 14A to 14C.

Figure 15:
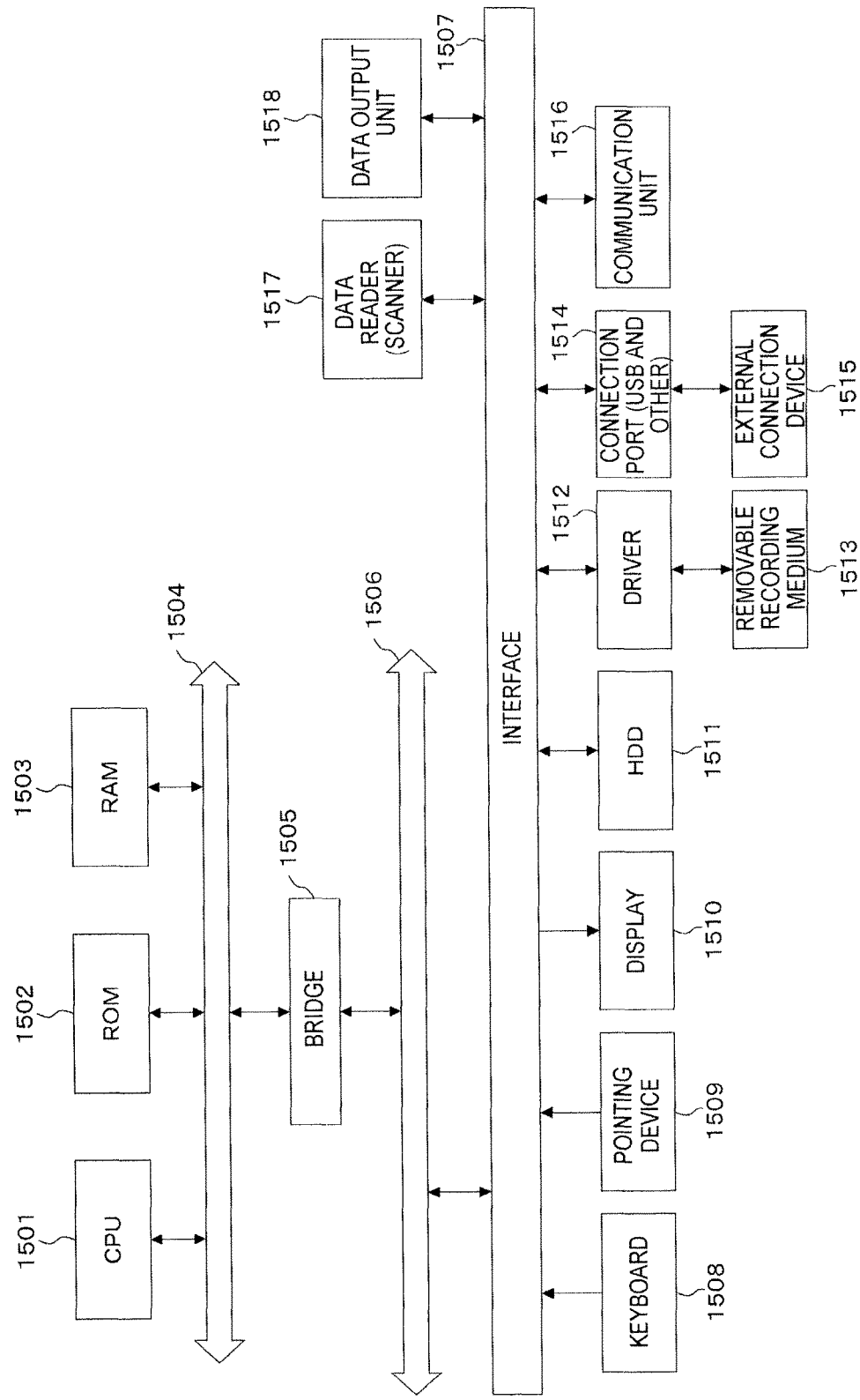
FIG. 15 is a block diagram showing a hardware configuration example of a computer for implementing this exemplary embodiment.

Hereinafter, a hardware configuration example of the print controller according to this exemplary embodiment will be described with reference to FIG. 15. FIG. 15 illustrates an example of a hardware configuration which is configured with, for example, a personal computer (PC) or the like and includes a data reader 1517 such as a scanner and a data output unit 1518 such as a printer.

A CPU (Central Processing Unit) 1501 is a controller that executes a process according to a computer program describing an execution sequence of each of the modules described in the above exemplary embodiments, specifically, the reception module 110, the sample print instruction module 120, the option change module 130, the notification module 140, the real print instruction module 150, the print management information specifying module 1260, the print management information managing module 1270, or the like.

A ROM (Read Only Memory) 1502 stores programs, arithmetic parameters or the like used by the CPU 1501. A RAM (Random Access Memory) 1503 stores programs used in the execution of the CPU 1501, parameters appropriately changed in the execution, or the like. The CPU 1501, the ROM 1502, and the RAM 1503 are interconnected by a host bus 1504 including a CPU bus or the like.

The host bus 1504 is connected to an external bus 1506 such as a peripheral component interconnect/interface (PCI) via a bridge 1505.

A keyboard 1508 and a pointing device 1509 such as a mouse are operated by an operator. A display 1510 may be a liquid crystal display, a cathode ray tube (CRT) or the like and displays various information as text or image information. In addition, a touch screen or the like having both functions of the pointing device 1509 and the display 1510 may be included.

A hard disk drive (HDD) 1511 includes a hard disk (or a flash memory or the like) and drives the hard disk to write or reproduce a program or information to be executed by the CPU 1501. The hard disk implements a function as the print job storage module 1280 or the like. In addition, the hard disk stores other various data (the option table 900 or the like) and various computer programs or the like.

A driver 1512 reads data or a program recorded in a removable recording medium 1513 such as a magnetic disk, an optical disc, a magnetooptical disc, or a semiconductor memory and supplies the data or the program to the RAM 1503 connected via an interface 1507, the external bus 1506, the bridge 1505, and the host bus 1504. In addition, the removable recording medium 1513 may also be used as a data write area.

A connection port 1514 is connected with an external connection device 1515 and has a connector such as USB or IEEE1394. The connection port 1514 is connected to the CPU 1501 or the like via the interface 1507, the external bus 1506, the bridge 1505, the host bus 1504 or the like. A communication unit 1516 is connected to a communication line and executes a process of data communication with the outside. The data reader 1517 is, for example, a scanner and executes a process of reading a document. The data output unit 1518 is, for example, a printer and executes a process of outputting document data.

In addition, the hardware configuration illustrated in FIG. 15 is a configuration example. The present exemplary embodiment is not limited to the configuration illustrated in FIG. 15, and may have any configuration that is able to execute the modules described in the present exemplary embodiment. For example, some of the modules may be configured as a dedicated hardware (an application specific integrated circuit (ASIC) for a specific use and the like), and some of the modules may be provided within an external system and connected through a communication line. In addition, the plural systems illustrated in FIG. 15 may be connected to each other by plural interconnection communication lines to operate in cooperation with each other.

In addition, the above-described programs may be provided by being stored in a recording medium or the programs may be provided by a communication unit. In this case, for example, the above-described program may be construed as an invention of a "computer readable recording medium storing a program."

The "computer readable recording medium storing a program" indicates a computer readable recording medium storing a program, which is useful for installation, execution, distribution and the like of a program.

In addition, the recording medium is, for example, a digital versatile disc (DVD) such as "DVD-R, DVD-RW, and DVD-RAM" which are formats defined in the DVD forum, and "DVD+R and DVD+RW" which are formats defined for DVD+RW, a compact disc (CD) such as a CD read only memory (CD-ROM), a CD recordable (CD-R), and a CD rewritable (CD-RW), a Blu-ray (registered trademark) disc, a magnetooptical (MO) disc, a flexible disc (FD), a magnetic tape, a hard disk, a read-only memory (ROM), an electrically erasable and programmable read-only memory (EEPROM (registered trademark)), a flash memory, a random access memory (RAM), and a secure digital (SD) memory card.

In addition, all or some of the above-described programs may be saved or distributed by being recorded in the recording medium. The programs may be caused to be transmitted by a communication using a transmission medium such as a wired network, a wireless communication network, or a combination thereof used for a local area network (LAN), a metropolitan area network (MAN), a wide area network (WAN), the Internet, the Intranet, the Extranet and others. In addition, the programs may be carried by carrier waves.

Furthermore, the above-described programs may be some or the entirety of other programs, or may be recorded together with separate programs in a recording medium. In addition, the programs may be divided and recorded in plural recording media. In addition, the programs may be recorded in any form, such as compression or encryption, as long as the programs in that form may be restorable.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print controller comprising:
a processor and associated memory configured to:
receive a print job in a job ticket format from a print work flow system;
when the received print job includes an effect that a test print according to the print job is to be executed, and as a result of interpretation of the print job that includes the effect, instruct a printing device to execute the test print using a portion of print data included in the print job;
change a job option included in the print job; and
notify the print work flow system of test print-related information when the test print instructed to be executed is ended.

2. The print controller according to claim 1, wherein the processor further sets the number of output copies according to the print job as 1 as the test print.

3. The print controller according to claim 2, wherein when the print job is a variable print, the processor performs as the test print a print using one record of the print data included in the print job.

4. The print controller according to claim 3, wherein the processor further instructs the printing device to execute a real print job when a response of the print work flow system to the notified test print-related information is received from the print work flow system, the response being information indicating an approval for the test print.

5. The print controller according to claim 4, wherein the processor unifies test print-related information including at least the number of prints and real print-related information including at least the number of prints, and notifies the print work flow system of the unified information.

6. The print controller according to claim 2, wherein the processor includes a job option of a portion changed in the test print-related information.

7. The print controller according to claim 2, wherein the processor further instructs the printing device to execute a real print job when a response of the print work flow system to the notified test print-related information is received from the print work flow system, the response being information indicating an approval for the test print.

8. The print controller according to claim 7, wherein the processor unifies test print-related information including at least the number of prints and real print-related information including at least the number of prints, and notifies the print work flow system of the unified information.

9. The print controller according to claim 1, wherein when the print job is a variable print, the processor performs as the test print a print using one record of the print data included in the print job.

10. The print controller according to claim 9, wherein the processor includes a job option of a portion changed in the test print-related information.

11. The print controller according to claim 9, wherein the processor further instructs the printing device to execute a real print job when a response of the print work flow system to the notified test print-related information is received from the print work flow system, the response being information indicating an approval for the test print.

12. The print controller according to claim 11, wherein the processor unifies test print-related information including at least the number of prints and real print-related information including at least the number of prints, and notifies the print work flow system of the unified information.

13. The print controller according to claim 1, wherein the processor includes a job option of a portion changed in the test print-related information.

14. The print controller according to claim 1, wherein the processor further instructs the printing device to execute a real print job when a response of the print work flow system to the notified test print-related information is received from the print work flow system, the response being information indicating an approval for the test print.

15. The print controller according to claim 14, wherein the processor unifies test print-related information including at least the number of prints and real print-related information including at least the number of prints, and notifies the print work flow system of the unified information.

16. A print control method comprising:
receiving a print job in a job ticket format from a print work flow system;
when the received print job includes an effect that a test print according to the print job is to be executed, and as a result of interpretation of the print job that includes the effect, instructing a printing device to execute a test print using a portion of print data included in the print job;
changing a job option included in the print job; and
notifying the print work flow system of test print-related information when the test print instructed to be executed by the instructing is ended.

17. A non-transitory computer readable medium storing a print control program causing a computer to:
receive a print job in a job ticket format from a print work flow system;
when the received print job includes an effect that a test print according to the print job is to be executed, and as a result of interpretation of the print job that includes the effect, instruct a printing device to execute a test print using a portion of print data included in the print job;
change a job option included in the print job; and
notify the print work flow system of test print-related information when the test print instructed to be executed is ended.

* * * * *